(12) United States Patent
Garcia et al.

(10) Patent No.: US 10,292,199 B2
(45) Date of Patent: May 14, 2019

(54) METHOD AND COMMUNICATION DEVICE FOR PERFORMING LINK ADAPTATION

(71) Applicant: Telefonaktiebolaget LM Ericsson (publ), Stockholm (SE)

(72) Inventors: Virgile Garcia, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/529,712

(22) PCT Filed: Dec. 5, 2014

(86) PCT No.: PCT/CN2014/093126
§ 371 (c)(1),
(2) Date: May 25, 2017

(87) PCT Pub. No.: WO2016/086408
PCT Pub. Date: Jun. 9, 2016

(65) Prior Publication Data
US 2017/0332433 A1    Nov. 16, 2017

(51) Int. Cl.
*H04W 76/20*    (2018.01)
*H04L 1/00*    (2006.01)
(Continued)

(52) U.S. Cl.
CPC ........... *H04W 76/20* (2018.02); *H04L 1/0015* (2013.01); *H04L 1/18* (2013.01); *H04W 72/04* (2013.01);
(Continued)

(58) Field of Classification Search
CPC ..... H04W 76/04; H04W 72/04; H04W 72/00; H04W 72/0493; H04W 72/12;
(Continued)

(56) References Cited

U.S. PATENT DOCUMENTS

| | | | |
|---|---|---|---|
| 9,287,964 B2* | 3/2016 | Stephens | H04B 7/15 |
| 2002/0068560 A1* | 6/2002 | Agin | H04L 1/0003 |
| | | | 455/423 |

(Continued)

FOREIGN PATENT DOCUMENTS

| | | |
|---|---|---|
| CN | 101843009 | 11/2007 |
| EP | 2 187 554 | 5/2010 |

(Continued)

OTHER PUBLICATIONS

Towards Systems Beyond 3G Based on Adaptive OFDMA Transmission; Wireless systems that assign different sets of frequencies to different terminals promise to provide high performance to meet the challenging requirements of future systems—by Mikael Sternad et al.; proceedings of the IEEE, vol. 95, No. 12—Dec. 2007.

(Continued)

*Primary Examiner* — Warner Wong
(74) *Attorney, Agent, or Firm* — Sage Patent Group

(57) ABSTRACT

The present disclosure provides a method implemented in an Access Node (AN) for performing Link Adaptation (LA) for a radio link to which different types of resources are allocated. The method comprises operating separate LA instances for the different types of resources to separately adapt Modulation and Coding Schemes (MCS's) for the different types of resources. The method further comprises performing transmissions on the different types of resources according to the separately adapted MCS's. Also, the present disclosure provides an AN for performing the LA.

18 Claims, 6 Drawing Sheets

(51) Int. Cl.
*H04W 72/04* (2009.01)
*H04L 1/18* (2006.01)
*H04L 12/811* (2013.01)
*H04L 12/911* (2013.01)
*H04W 4/18* (2009.01)
*H04L 5/00* (2006.01)

(52) U.S. Cl.
CPC ............ *H04L 5/0035* (2013.01); *H04L 47/38* (2013.01); *H04L 47/70* (2013.01); *H04W 4/18* (2013.01)

(58) Field of Classification Search
CPC . H04L 1/0015; H04L 5/0058; H04L 12/5692; H04L 27/2608; H04L 2012/5631; H04L 41/0896; H04L 41/70; H04L 71/788
See application file for complete search history.

(56) References Cited

U.S. PATENT DOCUMENTS

| | | | | |
|---|---|---|---|---|
| 2003/0021243 | A1* | 1/2003 | Hannalainen | H04L 1/0009 370/329 |
| 2003/0043732 | A1* | 3/2003 | Walton | H04L 1/0009 370/208 |
| 2004/0081248 | A1* | 4/2004 | Parolari | H04L 1/0003 375/259 |
| 2004/0176111 | A1* | 9/2004 | Wilhelm | H04L 1/0003 455/456.6 |
| 2005/0245198 | A1* | 11/2005 | Brignol | H04L 1/0003 455/70 |
| 2006/0034244 | A1* | 2/2006 | Huang | H04L 1/0009 370/344 |
| 2006/0039318 | A1* | 2/2006 | Oh | H04L 5/0007 370/328 |
| 2007/0183529 | A1* | 8/2007 | Tujkovic | H04B 7/0413 375/267 |
| 2007/0274252 | A1* | 11/2007 | Zhang | H04L 5/0023 370/328 |
| 2009/0147755 | A1 | 6/2009 | Liu et al. | |
| 2010/0014500 | A1* | 1/2010 | Lee | H04L 1/0017 370/342 |
| 2010/0074195 | A1* | 3/2010 | Cheng | H04L 1/0003 370/329 |
| 2011/0237272 | A1* | 9/2011 | Gorokhov | H04B 7/024 455/452.1 |
| 2012/0135778 | A1* | 5/2012 | Tian | H04L 1/0003 455/522 |
| 2014/0126467 | A1 | 5/2014 | Lu et al. | |
| 2015/0117196 | A1* | 4/2015 | Wang | H04L 1/0018 370/232 |

FOREIGN PATENT DOCUMENTS

| | | |
|---|---|---|
| WO | WO 2007 055551 | 5/2007 |
| WO | 2012 085700 A1 | 6/2012 |
| WO | WO 2014 047773 | 4/2014 |
| WO | WO 2014 047815 | 4/2014 |
| WO | WO 2015 110145 | 7/2015 |

OTHER PUBLICATIONS

3GPP TSG RAN WG1 Meeting #75; San Francisco, USA; Source: Samsung; Title: Evaluation results of coordinated scheduling for scenario 1 with non-ideal backhaul (R1-135825)—Nov. 11-15, 2013.

Extended European Search Report for Application No./U.S. Pat. No. 14907260.5-1220 / 3228135 PCT/CN2014093126—dated Jul. 6, 2018.

PCT Notification of Transmittal of the International Search Report and the Written Opinion of the International Searching Authority, or the Declaration for International application No. PCT/CN2014/093126—dated Sep. 11, 2015.

\* cited by examiner

Template frame of Link 1

Template frame of Link 2

METHOD AND COMMUNICATION DEVICE FOR PERFORMING LINK ADAPTATION

PRIORITY

This nonprovisional application is a U.S. National Stage Filing under 35 U.S.C. § 371 of International Patent Application Serial No. PCT/CN2014/093126 filed Dec. 5, 2014, and entitled "Method And Communication Device For Performing Link Adaptation."

TECHNICAL FIELD

The present disclosure generally relates to the technical field of wireless communications, and particularly, to a method implemented in an Access Node (AN) for performing link adaptation as well as the AN.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Due to the increasing demand to enhance wireless capacity and due to lack of availability of spectrum in lower frequency range (e.g. 800 MHz-3 GHz), the use of frequencies in 10's of GHz range is being investigated. For the future wireless network, investigations are going on to explore higher frequency bands, for instance, in the range of 30 GHz, 60 GHz and 98 GHz. At this frequency, a very large bandwidth of spectrum is available. This means both operating frequency and bandwidth for the future networks are expected to be much higher than those for legacy wireless networks.

However, due to large signal attenuation with respect to path loss, the network operating over such high frequencies is supposed to cover small areas with densely deployed radio access nodes (ANs). Considering that such dense deployment is particularly useful to provide sufficient coverage for indoor/hot areas, it has been agreed to exploit Ultra-Density Network (UDN), which is also referred to as millimeter Wave-Radio Access Technology (mmW-RAT), for the future wireless system.

Currently, it is supposed that the total carrier bandwidth of the mmW-RAT can be up to 1 or 2 GHz. This bandwidth can be composed by a number of sub-band carriers of a certain bandwidth, e.g. 100 MHz. By way of example, FIG. 1 illustrates one mmW-RAT carrier with 4 sub-bands. The smallest resource grid in the figure is an Atomic Scheduling Unit (ASU), which corresponds to a subband in the frequency domain and to a subframe in the time domain.

To allocate the available resources, a contention based resource allocation scheme and/or a scheduling based resource allocation scheme may be applied.

One example of the contention based resource allocation scheme is the well-known Institute of Electrical and Electronics Engineers (IEEE) 802.11 standard, wherein a communication device (e.g., a User Equipment (UE)) shall firstly send a contention message to make a reservation for some resources before occupying them and the resource reservation is successful if it is accepted by a peer communication device (e.g., an AN serving the UE). In such a manner, it can be ensured that resources are dedicatedly occupied by the communication device making the successful reservation. Accordingly, collision between communication devices in resource occupation can be avoided.

In the scheduling based resource allocation scheme, a Central Control Unit (CCU) shared by a cluster of Access Nodes (ANs) is relied on to allocate resources to different radio links. To be specific, the CCU configures, for each of the radio links associated with the ANs, a template frame indicating multiple types of resources allocated to the radio link.

By way of illustration rather than limitation, in a mobile network based on the mmW-RAT, the resources allocated to a radio link may be classified into dedicated resources, on which data transmission can be performed with high reliability, and shared resources, on which data transmission of lower reliability can be performed to achieve enhanced data rate. If a radio link is allocated with dedicated resources, the radio link will have the highest priority to access these resources while any other radio link shall control its interference to the radio link on the allocated dedicated resources. On the other hand, if a radio link is allocated with shared resources, both the radio link and other radio links can access these resources and the use of these resources by one of the radio links may produce interference to the others.

For illustration, an exemplary radio network where the scheduling based resource allocation scheme may be implemented is depicted in FIG. 2. In addition to AN1-AN4, the network comprises a CCU responsible to determine, for radio link 1, a template frame based on relevant measurements and/or data rate requests from peer communication devices (i.e., AN1 and User Equipment 1 (UE1)) on radio link 1. Further, the template frame determined for radio link 1 can be updated by the CCU during a communication session according to various varying factors, such as interference measurements and/or data rate requests from radio link 2 which is a neighboring link of radio link 1. Likewise, the CCU determines a template frame for radio link 2 and updates the template frame by taking into account radio link 1's impact on radio link 2.

Further details of the template frames configured for radio links 1 and 2 are given in FIG. 3. As illustrated, each of the template frames specifies, for its associated radio link whose number is given in the colored ASUs, both dedicated resources (shown as dark-colored ASUs) and shared resources (shown as light-colored ASUs).

Instead of being applied separately, the contention based resource allocation scheme and the scheduling based resource allocation scheme may be applied jointly (for example, in a time division manner) as illustrated in FIG. 4. Accordingly, contention-based resources may be allocated to a radio link, in addition to the dedicated and shared resources. Then, the resources allocated to the radio link may be classified into scheduling-based resources (including both the dedicated and shared resources) and contention-based resources, instead of being classified into dedicated and shared resources.

Referring back to FIG. 3, the scheduling based resource allocation scheme allows certain ASUs to be allocated to radio link 1 as dedicated resources and meanwhile allocated to radio link 2 as shared resources.

To make full use of the time-varying capacity of a radio link, the Link Adaption (LA) technology has been proposed and widely adopted in wireless networks. According to the existing LA approach, a single LA process is run for one radio link to adaptively select, according to measurements and acknowledgement feedbacks associated with the link, Modulation and Coding Schemes (MCS's) for transmissions on the radio link aiming at a desired quality target (such as Block Error Rate (BLER)). As such, the selected Modulation and Coding Scheme (MCS) can be adaptive to the channel fading variation and more importantly the interference variation of the link, and hence the usage efficiency of the resources allocated to the link can be significantly improved.

Due to the fact that the resource allocation scheme in for example the 5G network is much different from that in the legacy wireless networks (particularly, in the 5G network, one radio link may be allocated with different types of resources), simply adopting the existing LA approach in the 5G network may lead to non-optimal link performance.

SUMMARY

In view of the foregoing, an object of the present disclosure is to provide a novel LA approach, which enables improved link performance over the existing LA approach when applied for a radio link that is allocated with different types of resources.

To achieve this object, according to a first aspect of the present disclosure, there is provided a method implemented in an AN for performing LA for a radio link to which different types of resources are allocated. The method comprises operating separate LA instances for the different types of resources to separately adapt MCS's for the different types of resources. The method further comprises performing transmissions on the different types of resources according to the separately adapted MCS's.

By operating separate LA instances to separately adapt MCS's for different types of resources and performing transmissions on the resources according to the separately adapted MCS's, resource type specific link adaptation can be achieved, which allows independent MCS selections for the different types of resources and accordingly an improved link performance.

In an embodiment, the separate LA instances may be different from each other in terms of their algorithm and/or parameter.

In an embodiment, the method may further comprise receiving from a CCU an LA map which specifies, for each of the separate LA instances, an algorithm, one or more parameters and initial values of the parameters. Additionally, the method may further comprise replacing the specified algorithm and/or parameters with default algorithm and/or parameters, if the AN cannot run an LA instance using the specified algorithm and/or parameters. Additionally or alternatively, the method may further comprise modifying the specified algorithm, parameters and/or initial values based on the AN's knowledge of local traffic and/or channel conditions for the radio link.

As such, the determination of the configurations of the LA instances can benefit from the CCU's detailed knowledge about the link environment (for example, expected interference from neighboring links to the link concerned).

In an embodiment, the method may further comprise determining, for each of the separate LA instances, an algorithm, at least one parameters and initial values of the parameters based on the AN's knowledge of local traffic and/or channel conditions for the radio link.

As such, the determination of the configurations of the LA instances can benefit from the AN's precise and up-to-date local information (such as transmission conditions for the link concerned, which may be derived from radio link measurements made by the UE on the link and/or by the AN itself).

In an embodiment, the method may further comprise updating values of the parameters of the separate LA instances, based on feedbacks for the transmissions performed on the different types of resources.

As such, the MCS's selected by the separate LA instances may be better adapted to the current transmission conditions of the different types of resources.

In an embodiment, the initial values of the parameters of at least one of the separate LA instances may be: values that enable transmissions on the resources, for which the at least one LA instance is operated, to have a failure probability lower than a threshold; values that enable a convergence of the MCS, which is adapted by the at least one LA instance, to be accelerated; or values previously used in link adaptation for the radio link.

In an embodiment, the different types of resources may comprise shared resources for which one of the separate LA instances is operated for. The operating separate LA instances for the different types of resources to separately adapt MCS's for the different types of resources may comprise filtering out, for said one LA instance, feedbacks indicating instantaneous degrade in quality of transmissions on the shared resources.

As such, it is possible to prevent the LA instance from being overacting to reduce the transmission rate for the shared resources if the NACK or the like results from the burst interference.

In an embodiment, one of the LA instances may be split into a number of sub-instances, in case the resources for which said one of the LA instances is operated can be categorized into the same number of groups according to transmission qualities for the resources.

As such, it is possible for the groups of resources with similar transmission qualities to be managed separately by the sub-instances. Accordingly, the undesirable scenario may be avoided where said one LA instance reduces the transmission rate on all groups of resources even if a transmission rate reduction is needed for only one group of resources.

In an embodiment, at least two of the sub-instances may be merged into a single LA instance, in case the resources for which said at least two sub-instances are operated can be categorized into a single group according to transmission qualities for the resources.

In an embodiment, the method may be implemented in a mobile communications network based on mmW-RAT.

According to a second aspect of the present disclosure, there is provided an AN for performing LA for a radio link to which different types of resources are allocated. The AN comprises an LA instance operation section and a transmission section. The LA instance operation section is configured to operate separate LA instances for the different types of resources to separately adapt MCS's for the different types of resources. The transmission section is configured to perform transmissions on the different types of resources according to the separately adapted MCS's.

According to a third aspect of the present disclosure, there is provided an AN for performing LA for a radio link to which different types of resources are allocated. The AN comprises a transceiver, a processor and a memory. The memory has machine-readable program code stored therein. The processor executes the stored program code to operate separate LA instances for the different types of resources to separately adapt MCS's for the different types of resources.

The transceiver performs transmissions on the different types of resources according to the separately adapted MCS's.

According to a fourth aspect of the present disclosure, there is provided an AN for performing LA for a radio link to which different types of resources are allocated. The AN comprises means adapted to operate separate LA instances for the different types of resources to separately adapt MCS's for the different types of resources. The means is further adapted to perform transmissions on the different types of resources according to the separately adapted MCS's.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figure 1:
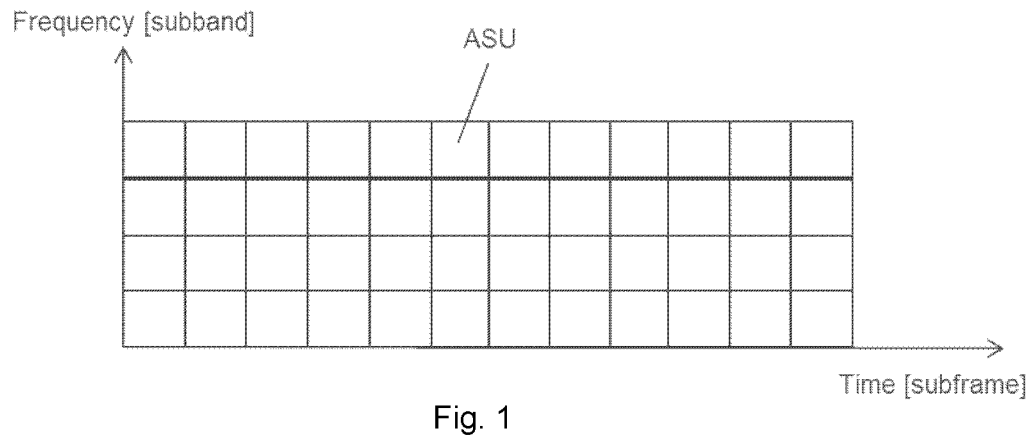
FIG. 1 is a diagram conceptually illustrating a mmW-RAT carrier and associated subbands, subframes and ASUs.
Figure 2:
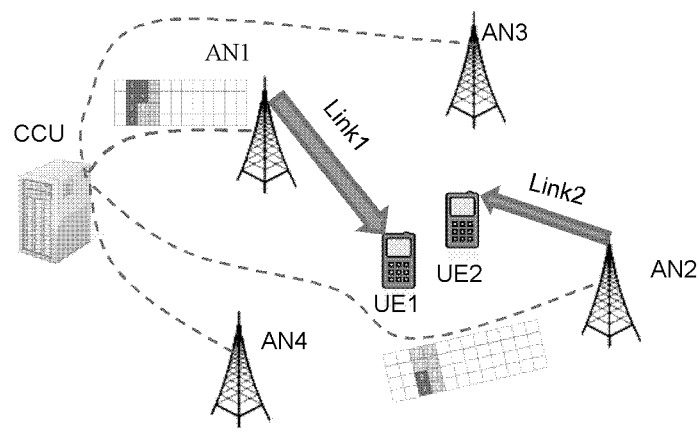
FIG. 2 is a diagram schematically illustrating an exemplary network where a scheduling based resource allocation scheme may be implemented.
Figure 3:
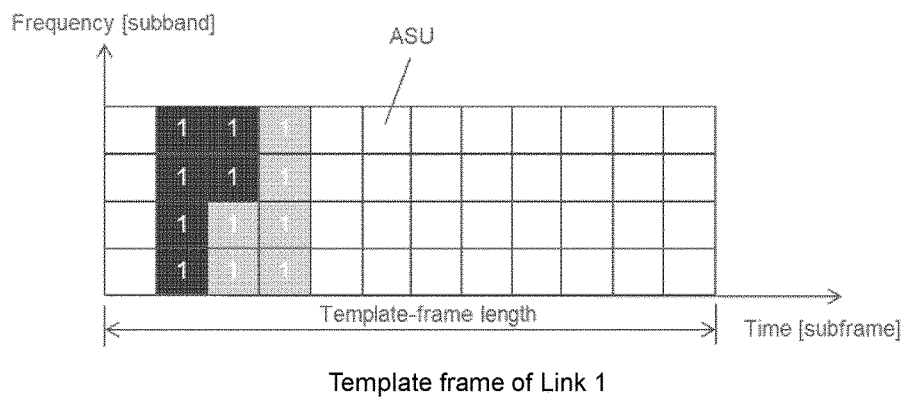
FIG. 3 is diagram schematically illustrating a template frame for each of radio links 1 and 2 in FIG. 2.
Figure 3:
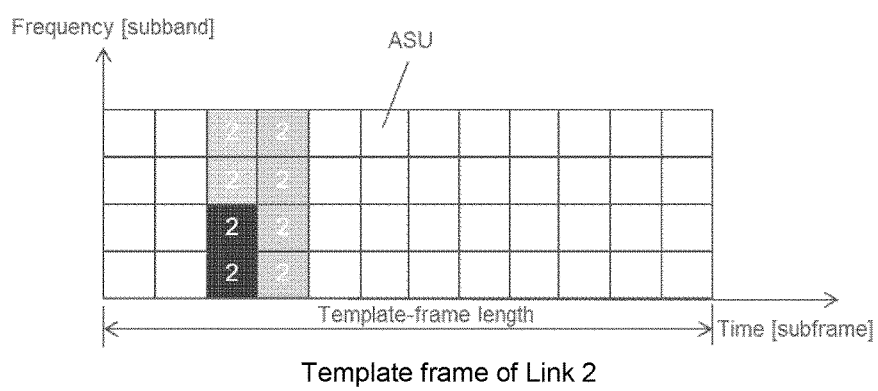

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology commonly used to describe the wireless network based on mmW-RAT is used in this disclosure to exemplify the embodiments, the scope of the disclosure is by no means limited in this regard. Other wireless systems may also benefit from exploiting the ideas covered within this disclosure, as long as a radio link in the wireless systems may be allocated with different types of resources.

As the inventors of the present application notice, if resources allocated to a radio link may be classified into different types according to their characteristics, it is often not optimal to run only a single LA process for the link.

Taking a wireless system based on mmW-RAT where resources allocated to a radio link may be classified into dedicated (reliable) resources and shared (unreliable) resources as an example, if a single LA process is run for the link, transmissions on the dedicated resources will be negatively impacted by failures of transmissions on the shared resources.

To be specific, suppose the LA process operated for the link performs MCS selection based on an effective Signal to Interference plus Noise Ratio (SINR), which is evaluated according to the following formula:

$$\text{effectiveSINR} = \text{measSINR} + \Delta_{adapted}$$

where effectiveSINR denotes the effective SINR, measSINR denotes a measured SINR and $\Delta_{adapted}$ denotes a backoff value. In case a Negative ACKnowledgement (NACK) is received, the backoff value is decreased by a step size. In case an ACK is received, the backoff value is increased by the step size factored by $$\frac{BLER}{1-BLER}.$$

If a low BLER target were applied, the LA process would drastically decrease the backoff value for both the dedicated and shared resources and thus cause a significant reduction in the transmission rate of the entire link even if few NACKs are fed back for transmissions on the shared resources. On the other hand, applying a relatively high BLER target would cause an increased number of retransmissions and hence a reduction in the transmission rate of the entire link as well.

To avoid or at least alleviate such undesirable effects, a resource type specific LA method is proposed here.

Figure 5:
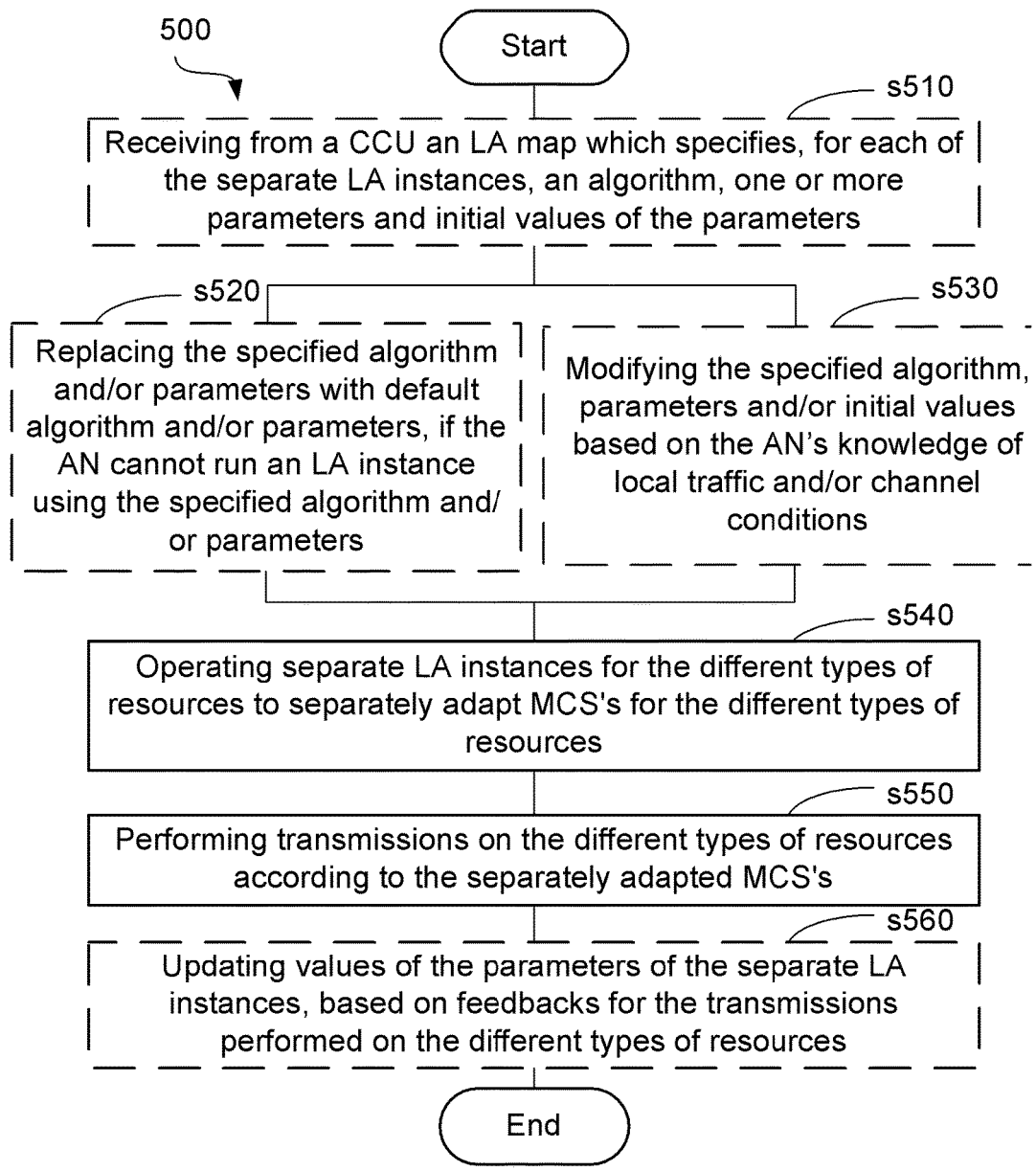
FIGS. 5-7 are flowcharts illustrating operations of exemplary methods implemented in an AN for performing LA according to embodiments of the present disclosure.

FIG. 5 schematically illustrates such a method 500 implemented in an AN for performing LA for a radio link to which different types of resources are allocated.

As illustrated, the method 500 comprises operations shown at blocks s540 and s550. Specifically, at block s540, separate LA instances are operated for the different types of resources to separately adapt MCS's for the different types of resources. Then, at block s550, transmissions are performed on the different types of resources according to the separately adapted MCS's.

Here, the term "LA instance" is used to refer to an LA process which operates, according to a certain LA algorithm and one or more related parameters, to adaptively adjust MCS's for transmissions on a set of radio resources.

By operating separate LA instances to separately adapt MCS's for different types of resources and performing transmissions on the resources according to the separately adapted MCS's, resource type specific link adaptation can be achieved, which allows independent MCS selections for the different types of resources and accordingly an improved link performance.

Again, taking the wireless system based on mmW-RAT as an example, by operating a first LA instance for dedicated resources allocated to a radio link and a second LA instance for shared resources allocated to the same link, MCS selections for the dedicated and shared resources can made independently from each other. Accordingly, transmissions on the dedicated resources would not be negatively impacted by failures of transmissions on the shared resources and the link performance would be improved over the existing LA approach. To be specific, even if the second LA instance changes the MCS scheme for transmissions on the shared resources from 16 Quadrature Amplitude Modulation (QAM) and 1/2 coding rate to 4 Phase Shift Keying (PSK) and 1/4 coding rate in response to receipt of NACKs with respect to the shared resources, the first LA instance may keep the MCS scheme for transmissions on the dedicated resources unchanged if no NACK is received with respect to the dedicated resources. As a result, the proposed resource type specific link adaptation approach increases the transmission rate of the entire radio link as compared with the existing LA approach.

Figure 4:
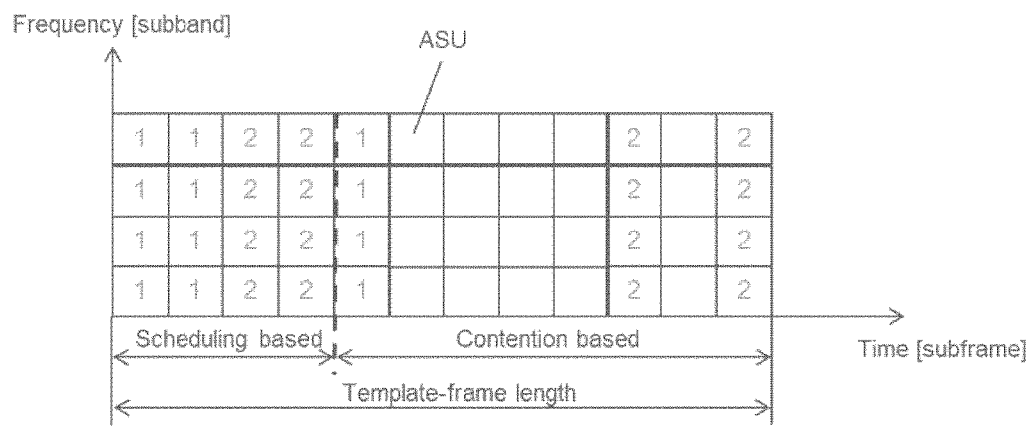
FIG. 4 is diagram schematically illustrating an exemplary time-division implementation of a contention based resource allocation scheme and a scheduling based resource allocation scheme.

Note that operating two separate LA instances respectively for dedicated and shared resources is given here just as an exemplary implementation of the proposed resource type specific LA method. Benefiting from the teachings of the present disclosure, those skilled in the art can contemplate various other implementations for different application scenarios. For example, in a scenario where the resources allocated to a link may be classified into contention-based resources and scheduling-based resources (including both the dedicated and shared resources) as illustrated in FIG. 4, the resource type specific LA method may be implemented by operating two separate LA instances respectively for the contention-based and scheduling-based resources.

By way of illustration rather than limitation, the separate LA instances may be different from each other in terms of their algorithm and/or parameter.

Specifically, considering that the dedicated resources are more reliable than the shared resources because the shared resources may experience higher interference variation, the first LA instance operated for the dedicated resources may be more aggressive than the second LA instance operated for the dedicated resources. That is, the first LA instance may adapt the MCS more rapidly and more closely to the scheme which enables most efficient transmissions given the current channel conditions of the dedicated resources, while the second LA instance adapts the MCS less rapidly and less closely to the scheme which enables most efficient transmissions given the current channel conditions of the dedicated resources.

For example, the first LA instance may use a direct measurement-based LA algorithm where, to match the BLER target, the MCS is deduced from the SINR derived from measurements for corresponding resources (such as pathloss, Channel Quality Indicator (CQI), etc.) and a margin is left on top of the deduced MCS so that the chance of meeting the BLER target is reasonably high, while the second LA instance may use an iterative ACK/NACK-based LA algorithm where a given MCS is allowed to be raised only if the MCS is validated by a number of successive successful transmissions.

Alternatively, both the first and second LA instances may use the iterative ACK/NACK-based LA algorithm or the direct measurement-based LA algorithm. In the former case, the number of successive successful transmissions may be set smaller for the first LA instance than for the second LA instance. In the latter case, the margin may be set smaller for the first LA instance than for the second LA instance.

In an embodiment, the configurations of the LA instances operated for the different types of resources allocated to a radio link, which include the algorithms of the LA instances and parameters related to the algorithms as well as initial values of the parameters, may be determined by a CCU which is responsible for determining a template frame for the radio link. Accordingly, the method 500 may further comprise receiving from the CCU an LA map which specifies, for each of the separate LA instances, an algorithm, one or more parameters and initial values of the parameters, as illustrated by block s510 in FIG. 5.

For example, for the first LA instance operated for the dedicated resources, the LA map may specify that the direct measurement-based LA algorithm whose related parameter is the target BLER shall be used and may assign an initial value to the related parameter. For the second LA instance operated for the shared resources, the LA map may specify that the iterative ACK/NACK-based LA algorithm whose related parameter is the number of successive successful transmissions shall be used and may assign an initial value to that parameter.

In this manner, the determination of the configurations of the LA instances can benefit from the CCU's detailed knowledge about the link environment.

As an enhancement, after receiving the LA map from the CCU, the AN may check whether or not it can run an LA instance using the algorithm and/or parameters specified by the received LA map and take countermeasures if the specified algorithm and/or parameters are not compatible with those supported by the AN.

Accordingly, the method 500 may further comprise replacing the specified algorithm and/or parameters with default algorithm and/or parameters, if the AN cannot run an LA instance using the specified algorithm and/or parameters, as illustrated by block s520 in FIG. 5.

Additionally or alternatively, the specified algorithm, parameters and/or initial values may be modified based on the AN's knowledge of local traffic and/or channel conditions (such as fading, interference, etc.) for the radio link at block s530. For example, the specified algorithm may be changed from the direct measurement-based LA algorithm to the iterative ACK/NACK-based LA algorithm if the local traffic for the radio link is heavy and/or if the channel conditions for the radio link is poor or vice versa. Accordingly, the related parameter (e.g., the BLER target for the direct measurement-based LA algorithm, the number of successive successful transmissions for the iterative ACK/NACK-based LA algorithm) and its initial value may be modified.

In another embodiment, instead of receiving the configurations of the LA instances from the CCU, the AN may itself determine for each of the separate LA instances, an algorithm, at least one parameters and initial values of the parameters based on its knowledge of local traffic and/or channel conditions for the radio link. For the sake of clarity, this is illustrated by block s510's as an operation of a method 500' shown in FIG. 6.

In this manner, the determination can benefit from the AN's precise and up-to-date local information (such as transmission conditions for the link concerned, which may be derived from radio link measurements made by the UE on the link and/or by the AN itself).

Figure 6:
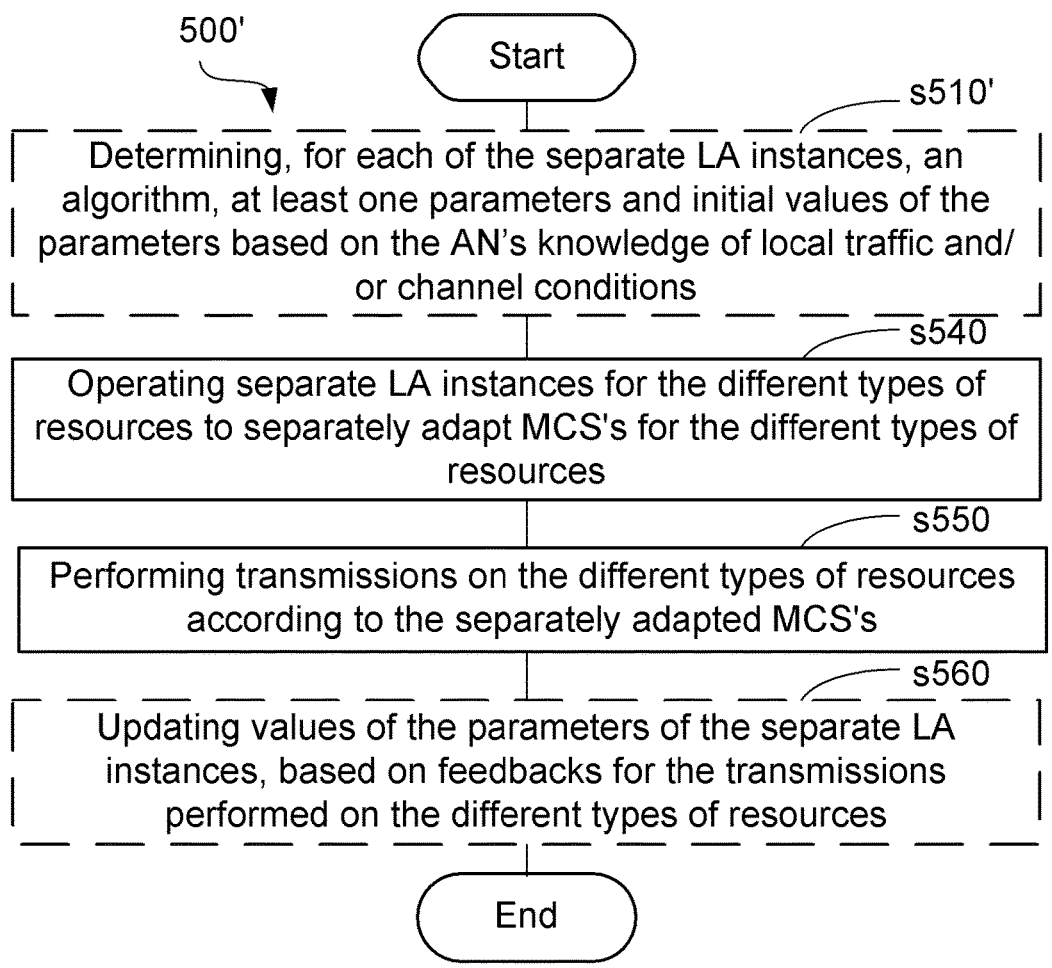

In an embodiment, both the methods 500 and 500' may further comprise updating values of the parameters of the separate LA instances, based on feedbacks for the transmissions performed on the different types of resources, as illustrated by block s560 in FIGS. 5 and 6. For example, for an LA instance applying the direct measurement-based LA algorithm, the value of the BLER target may be increased if NACK feedbacks for transmissions performed on the dedicated resources occur successively or vice versa. For an LA instance applying the iterative ACK/NACK-based LA algorithm, the value of the number of successive successful transmissions may be increased if NACK feedbacks for transmissions performed on the shared resources occur successively or vice versa.

As such, the MCS's selected by the separate LA instances may be better adapted to the current transmission conditions of the different types of resources.

In practical implementation, the initial values of the parameters of at least one of the separate LA instances may be set, based on various criteria, when the template frame and the LA instance configurations are initially determined or when the initially determined template frame is updated and causes a change in the LA instance configurations.

According to a conservative criterion, the initial values may be set as values that enable transmissions on the resources, for which the at least one LA instance is operated, to have a failure probability lower than a threshold. For example, for an LA instance applying the direct measurement-based LA algorithm, the initial value of the BLER target may be set to a small value. Thus, a low order MCS may be selected for meeting the BLER target and transmissions based on the low order MCS are less likely to fail. For an LA instance applying the direct measurement-based LA algorithm, the initial value of the successive successful transmission number may be set to a large value. Thus, the MCS may be kept at a low order and transmissions based on the low order MCS are less likely to fail.

According to another criterion, the initial values may be set as values that enable a convergence of the MCS, which is adapted by the at least one LA instance, to be accelerated. For example, for an LA instance applying the direct measurement-based LA algorithm, the initial value of the BLER target may be set to a relatively large value. Thus, a relatively high order MCS may be selected for meeting the BLER target and accordingly the MCS may be converged to the high order MCS more quickly. For an LA instance applying the direct measurement-based LA algorithm, the initial value of the successive successful transmission number may be set to a relatively small value. Thus, the MCS may be raised to a relatively high order MCS by waiting less ACKs and accordingly the MCS may be converged to the high order MCS more quickly.

Here, the convergence of the MCS refers to the approaching of the selected MCS to a stable one (such as to a high order MCS). For example, the MCS may be firstly selected as a low order (e.g., 4PSK and 1/4 coding rate) ensuring a satisfactory transmission quality and then gradually raised to a high order (e.g., 16QAM and 1/2 coding rate) enabling an adequate transmission quality.

According to a further criterion, the initial values may be set as values previously used in link adaptation for the radio link.

The specific criterion used for setting the initial values may be chosen depending on various factors, such as how the resource type associated with the link concerned changes, the current channel conditions for the different types of resources, expected interference, etc.

In an embodiment, one of the LA instances may be split into a number of sub-instances, in case the resources for which said one of the LA instances is operated can be categorized into the same number of groups according to transmission qualities for the resources. For example, in case the dedicated resources may be categorized into a first group with a good transmission quality and a second group with a relatively poor transmission quality, two LA instances instead of a single LA instance may be operated for the first and the second groups of dedicated resources, respectively.

In this manner, it is possible for the groups of resources with similar transmission qualities to be managed separately by the sub-instances. Accordingly, the undesirable scenario may be avoided where said one LA instance reduces the transmission rate on all groups of resources even if a transmission rate reduction is needed for only one group of resources.

In case the resources for which said at least two sub-instances are operated can be categorized into a single group according to transmission qualities for the resources, at least two of the sub-instances may be merged into a single LA instance. For example, in case the dedicated resources may be categorized into a single group with similar transmission qualities instead of being categorized into the first group with a good transmission quality and the second group with a relatively poor transmission quality, a single LA instance instead of two LA instances may be operated for the dedicated resources.

In practical implementation, the transmission qualities for the resources may be derived based on various types of feedbacks for transmissions on the resources (such as ACK/NACK, SINR level, interference level, etc.)

According to the prior art LA algorithms, the receipt of an NACK or other types of feedbacks indicating strong interference (such as a poor SINR) always leads to a transmission rate reduction. This is not advisable especially for the shared resources, because the NACK or the like may result from either burst interference due to opportunistic short collisions on the shared resources or lasting interference due to a long-term interfering transmission. It is overreacting to reduce the transmission rate for the shared resources if the NACK or the like results from the burst interference.

Figure 7:
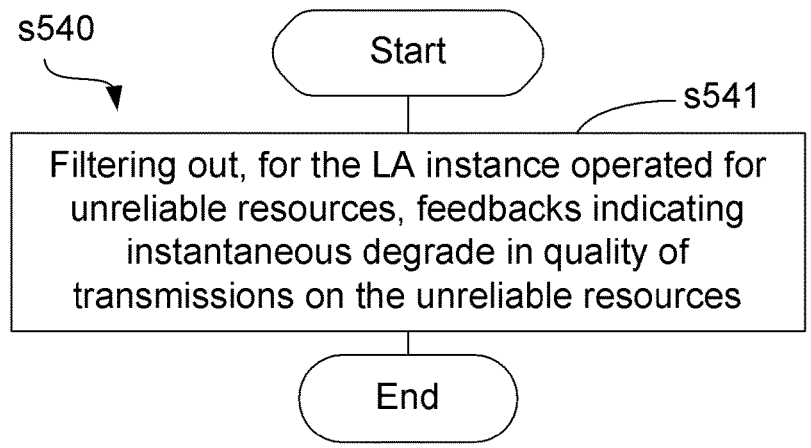

To avoid this overreaction, the operation shown at block s540 in FIGS. 5 and 6 may comprise filtering out, for the LA instance operated for the shared resources, feedbacks indicating instantaneous degrade in quality of transmissions on the shared resources, as illustrated by block s541 in FIG. 7.

As a simple implementation, the LA instance may refrain from triggering the transmission rate reduction when an NACK or the like is initially fed back to the transmitter and trigger the transmission rate reduction only if a NACK or the like is fed back to the transmitter successively.

In another implementation, the receiver may report a first type of feedback indicating short-term interference and a second type of feedback indicating long-term interference. The LA instance triggers the transmission rate reduction only if the second type of feedback is received at the transmitter.

In principle, the feedback filtering scheme may also be applied to the dedicated resources, although it is set forth mainly with respect to the shared resources.

Correspondingly to the above-described method 500 or 500', an AN may be provided for performing LA for a radio link to which different types of resources are allocated. The AN comprises means adapted to operate separate LA instances for the different types of resources to separately adapt MCS's for the different types of resources. The means is further adapted to perform transmissions on the different types of resources according to the separately adapted MCS's.

In the following, two possible functional architectures of the AN will be given with respect to FIGS. 8 and 9, wherein the AN is denoted as ANs 800 and 800' respectively.

Figure 8:
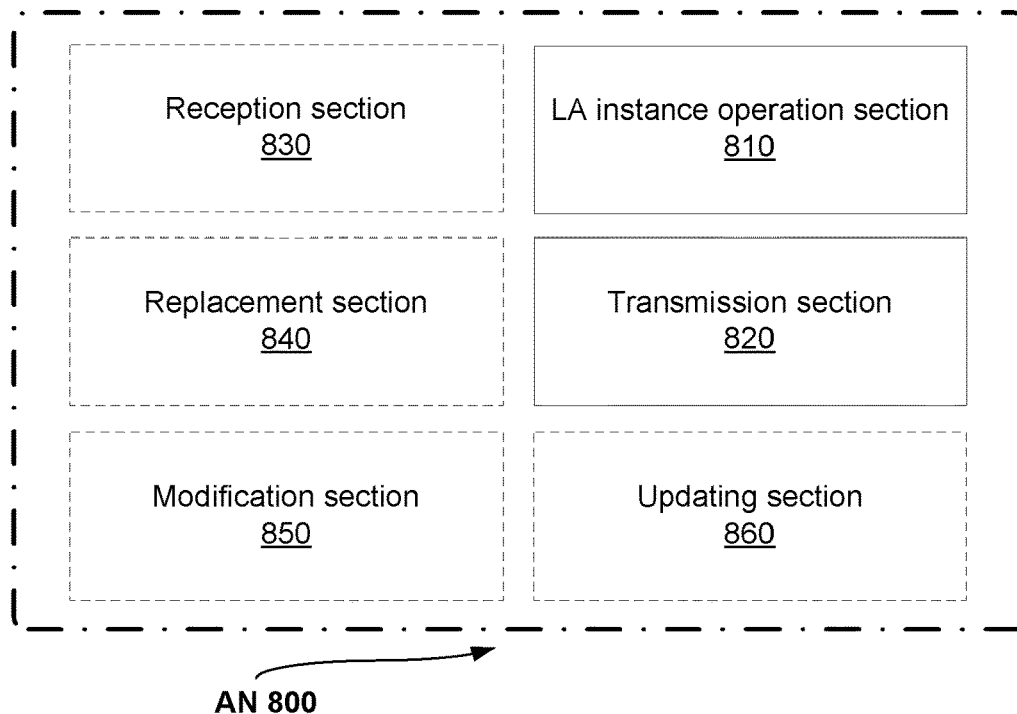
FIGS. 8-9 are block diagram illustrating functional modules of exemplary ANs according to embodiments of the present disclosure.
Figure 9:
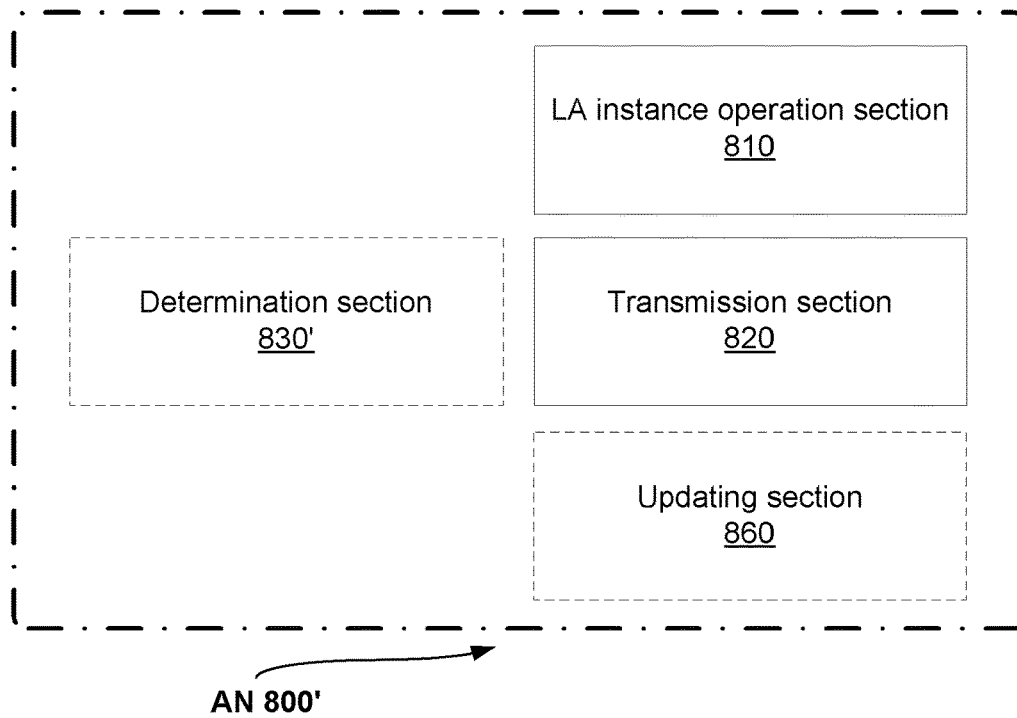

As shown in FIGS. 8 and 9, both the AN 800 and the AN 800' comprise an LA instance operation section 810 and a transmission section 820. The LA instance operation section 810 is configured to operate separate LA instances for the different types of resources to separately adapt MCS's for the different types of resources. The transmission section 820 is configured to perform transmissions on the different types of resources according to the separately adapted MCS's.

By operating separate LA instances to separately adapt MCS's for different types of resources and performing transmissions on the resources according to the separately adapted MCS's, resource type specific link adaptation can be achieved, which allows independent MCS selections for the different types of resources and accordingly an improved link performance.

In an embodiment, the separate LA instances may be different from each other in terms of their algorithm and/or parameter.

In an embodiment, both the AN 800 and the AN 800' may further comprise an updating section 860 as illustrated in FIGS. 8 and 9. The updating section 860 may be configured to update values of the parameters of the separate LA instances, based on feedbacks for the transmissions performed on the different types of resources.

As such, the MCS's selected by the separate LA instances may be better adapted to the current transmission conditions of the different types of resources.

In an embodiment, the different types of resources may comprise shared resources for which one of the separate LA instances is operated for. The LA instance operation section 810 may be configured to filter out, for said one LA instance, feedbacks indicating instantaneous degrade in quality of transmissions on the shared resources.

As such, it is possible to prevent the LA instance from being overacting to reduce the transmission rate for the shared resources if the NACK or the like results from the burst interference.

In an embodiment, one of the LA instances may be split into a number of sub-instances, in case the resources for which said one of the LA instances is operated can be categorized into the same number of groups according to transmission qualities for the resources. At least two of the sub-instances may be merged into a single LA instance, in case the resources for which said at least two sub-instances are operated can be categorized into a single group according to transmission qualities for the resources.

As such, it is possible for the groups of resources with similar transmission qualities to be managed separately by the sub-instances. Accordingly, the undesirable scenario may be avoided where said one LA instance reduces the transmission rate on all groups of resources even if a transmission rate reduction is needed for only one group of resources.

In an embodiment, the AN 800 may further comprise a reception section 830 as illustrated in FIG. 8. The reception section 830 may be configured to receive from a Central Control Unit (CCU) an LA map which specifies, for each of the separate LA instances, an algorithm, one or more parameters and initial values of the parameters.

As such, the determination of the configurations of the LA instances can benefit from the CCU's detailed knowledge about the link environment (for example, expected interference from neighboring links to the link concerned).

In an embodiment, the AN 800 may further comprise a replacement section 840 and/or a modification section 850 as illustrated in FIG. 8. The replacement section 840 may be configured to replace the specified algorithm and/or parameters with default algorithm and/or parameters, if the AN cannot run an LA instance using the specified algorithm and/or parameters. The modification section 850 may be configured to modify the specified algorithm, parameters and/or initial values based on the AN's knowledge of local traffic and/or channel conditions for the radio link.

In an embodiment, the AN 800' may further comprise a determination section 830' as illustrated in FIG. 9. The determination section 830' may be configured to determining, for each of the separate LA instances, an algorithm, at least one parameters and initial values of the parameters based on the AN's knowledge of local traffic and/or channel conditions for the radio link.

As such, the determination of the configurations of the LA instances can benefit from the AN's precise and up-to-date local information (such as transmission conditions for the link concerned, which may be derived from radio link measurements made by the UE on the link and/or by the AN itself).

In an embodiment, the initial values of the parameters of at least one of the separate LA instances may be: values that enable transmissions on the resources, for which the at least one LA instance is operated, to have a failure probability lower than a threshold; values that enable a convergence of the MCS, which is adapted by the at least one LA instance, to be accelerated; or values previously used in link adaptation for the radio link.

Though not repeated here for avoiding redundancy, the examples given above with respect to methods 500 and 500' are certainly applicable to AN 800 and AN 800'.

In light of the above-described functional architectures of AN 800 and AN 800', those skilled in the art can conceive various implementations, wherein the functional blocks of the AN 800 and AN 800' may be implemented in hardware, software, and/or firmware.

As an exemplary implementation, the above-described sections may be implemented separately as suitable dedicated circuits. Nevertheless, they can also be implemented using any number of dedicated circuits through functional combination or separation. In one embodiment, the above sections may be combined in a single application specific integrated circuit (ASIC).

Figure 10:
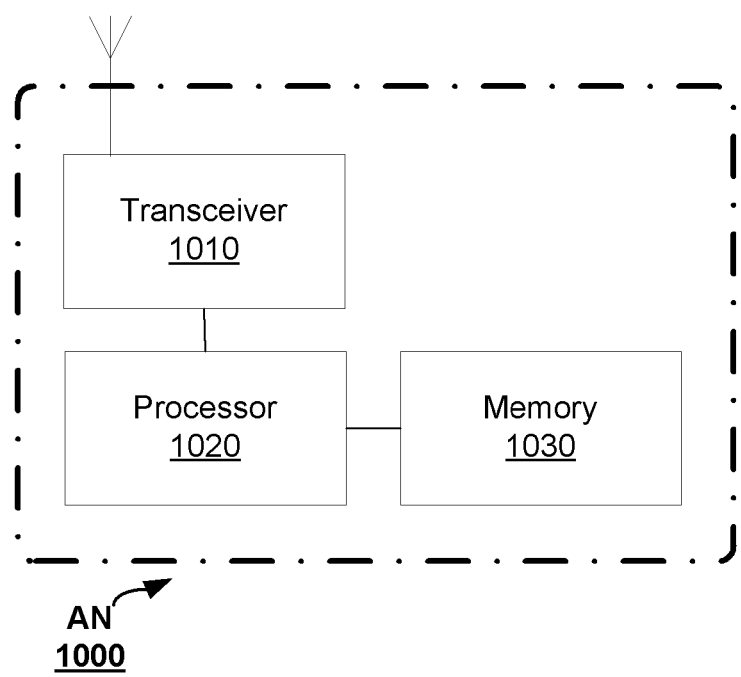
FIG. 10 is a block diagram illustrating an exemplary hardware implementation of the ANs according to embodiments of the present disclosure.

As an alternative implementation, there may be provided an AN 1100 comprising a transceiver 1010, a processor 1020 (including but not limited to a microprocessor, a microcontroller or a Digital Signal Processor (DSP), etc.) coupled to the transceiver 1010, and a memory 1030 coupled to the processor 1020, as illustrated in FIG. 10. The memory 1030 stores machine-readable program code. The processor 1020, when executing the stored program code, act as the LA instance operation section 810 and possibly the determination section 830', replacement section 840, modification section 850 and updating section 860. The transceiver 1010 performs transmissions on different types of resources according to MCS's separately adapted for the different types of resources by operating separate LA instances. The transceiver 1010 may further receive from a CCU an LA map which specifies, for each of the separate LA instances, an algorithm, one or more parameters and initial values of the parameters.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method implemented in an Access Node (AN) for performing Link Adaptation (LA) for a radio link to which different types of resources are allocated, the method comprising:
   operating separate LA instances for the different types of resources to separately adapt Modulation and Coding Schemes (MCS's) for the different types of resources, wherein one of the LA instances is split into a number of sub-instances, in case the resources for which said one of the LA instances is operated can be categorized into the same number of groups according to transmission qualities for the resources; and
   performing transmissions on the different types of resources according to the separately adapted MCS's.

2. The method of claim 1, wherein the separate LA instances are different from each other in terms of at least one of their algorithm and/or parameter.

3. The method of claim 1, further comprising: receiving from a Central Control Unit (CCU) an LA map which specifies, for each of the separate LA instances, an algorithm, one or more parameters and initial values of the parameters.

4. The method of claim 3, further comprising: replacing the specified algorithm and/or parameters with default algorithm and/or parameters, if the AN cannot run an LA instance using the specified algorithm and/or parameters.

5. The method of claim 3, wherein the initial values of the parameters of at least one of the separate LA instances are:
   values that enable transmissions on the resources, for which the at least one LA instance is operated, to have a failure probability lower than a threshold;
   values that enable a convergence of the MCS, which is adapted by the at least one LA instance, to be accelerated; or
   values previously used in link adaptation for the radio link.

6. The method of claim 1, wherein the different types of resources comprise shared resources for which one of the separate LA instances is operated for, and the operating separate LA instances for the different types of resources to separately adapt MCS's for the different types of resources comprises:
   filtering out, for said one LA instance, feedbacks indicating instantaneous degrade in quality of transmissions on the shared resources.

7. The method of claim 1, wherein at least two of the sub-instances are merged into a single LA instance, in case the resources for which said at least two sub-instances are operated can be categorized into a single group according to transmission qualities for the resources.

8. An Access Node, AN, for performing Link Adaptation, LA, for a radio link to which different types of resources are allocated, the AN comprising a transceiver, a processor coupled to the transceiver, and a memory coupled to the processor; wherein the memory stores machine-readable program code which, when executed by the processor, cause the AN to:
   operate separate LA instances for the different types of resources to separately adapt Modulation and Coding Schemes, MCS's, for the different types of resources, wherein one of the LA instances is split into a number of sub-instances, in case the resources for which said one of the LA instances is operated can be categorized into the same number of groups according to transmission qualities for the resources; and
   perform transmissions on the different types of resources according to the separately adapted MCS's.

9. The AN according to claim 8, wherein the separate LA instances are different from each other in terms of at least one of their algorithm and parameter.

10. The AN according to claim 8, wherein the memory further includes instructions which, when executed by the processor, cause the AN to: receive from a Central Control Unit, CCU, an LA map which specifies, for each of the separate LA instances, an algorithm, one or more parameters and initial values of the parameters.

11. The AN according to claim 10, wherein the memory further includes instructions which, when executed by the processor, cause the AN to: replace the specified algorithm and/or parameters with default algorithm and/or parameters, if the AN cannot run an LA instance using the specified algorithm and/or parameters.

12. The AN according to claim 10, wherein the memory further includes instructions which, when executed by the processor, cause the AN to:
   modify at least one of the specified algorithm, parameters and initial values based on the AN's knowledge of at least one of local traffic and channel conditions for the radio link.

13. The AN according to claim 8, wherein the memory further includes instructions which, when executed by the processor, cause the AN to:
   determine, for each of the separate LA instances, an algorithm, at least one parameters and initial values of the parameters based on the AN's knowledge of local traffic and/or channel conditions for the radio link.

14. The AN according to claim 8, wherein the memory further includes instructions which, when executed by the processor, cause the AN to:

update values of the parameters of the separate LA instances, based on feedbacks for the transmissions performed on the different types of resources.

15. The AN according to claim 10, wherein the initial values of the parameters of at least one of the separate LA instances are:
    values that enable transmissions on the resources, for which the at least one LA instance is operated, to have a failure probability lower than a threshold;
    values that enable a convergence of the MCS, which is adapted by the at least one LA instance, to be accelerated; or
    values previously used in link adaptation for the radio link.

16. The AN according to claim 10, wherein the different types of resources comprise shared resources for which one of the separate LA instances is operated for; and the AN is operable to:
    filter out, for said one LA instance, feedbacks indicating instantaneous degrade in quality of transmissions on the shared resources.

17. The AN according to claim 8, wherein at least two of the sub-instances are merged into a single LA instance, in case the resources for which said at least two sub-instances are operated can be categorized into a single group according to transmission qualities for the resources.

18. The AN according to claim 8, wherein the AN is implemented in a mobile communications network based on millimeter Wave-Radio Access Technology, mmW-RAT.

* * * * *